Dec. 8, 1936.  A. HÄNSCHKE  2,063,094
TURBINE PLANT
Filed Dec. 21, 1934  3 Sheets-Sheet 1

Inventor:
ALBERT HÄNSCHKE
by: Knight Bros.
Attorneys.

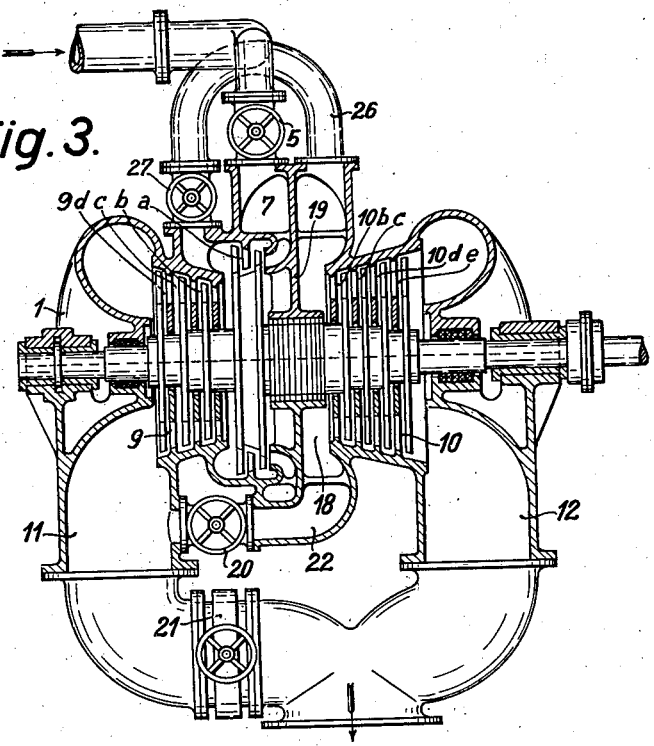

Patented Dec. 8, 1936

2,063,094

UNITED STATES PATENT OFFICE 2,063,094

TURBINE PLANT

Albert Hänschke, Kiel, Germany, assignor to Fried. Krupp Germaniawerft Aktiengesellschaft, Kiel-Gaarden, Germany Application December 21, 1934, Serial No. 758,642
In Germany January 9, 1934

5 Claims. (Cl. 60—70)

The invention relates to turbine plants, in particular for ships, of the kind having a double flow high pressure turbine in which the two parts of the high pressure turbine, which at high speed are arranged in parallel, are connected so as to be traversed in series when the vessel is to travel at low speeds only, as described in my co-pending application Serial Number 712,045, filed February 19, 1934. At small loads and low speeds of revolution this affords the advantage of a lower specific steam consumption, that is, a better economy of the plant being obtained.

In this arrangement the economy of the turbine plant may be further improved by a particular construction of the last stages of the high pressure turbine parts. For, the last stage of the turbine part, which at low speeds, with the series connection is traversed last, has to operate with a comparatively large fall. With the low number of revolutions corresponding to cruising speed this results in an unfavorably high velocity of flow of the steam relatively to the peripheral velocity, which impairs the efficiency of this last stage.

The present invention has now for its object, when the two high pressure parts of such a turbine plant are connected in series, to improve the efficiency of the last stage or stages of the last traversed part and thus to increase still further the economy of the whole plant. To this end the invention provides that the two parts of the high pressure turbine, which at high speed are arranged in parallel as to the flow of the steam, are designed so that each of the last stages of the part last traversed by the steam, with the series connection, operates with a smaller fall in heat than the corresponding last stages of the other part. This result is obtained by a corresponding distribution of the whole fall on the various stages, which fall is the same for the two turbine parts; for example, by providing a greater number of stages in the turbine part last traversed by the steam.

Figure 1:
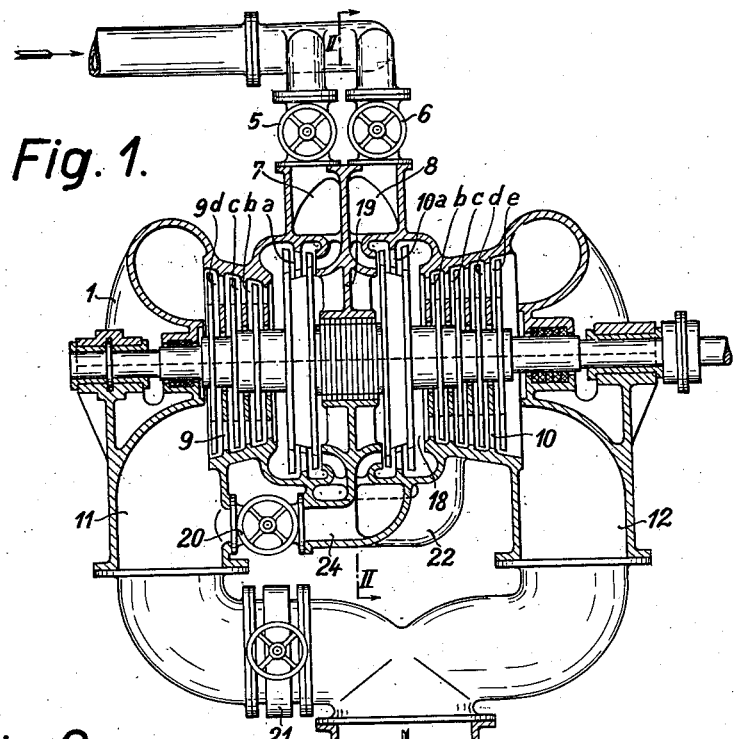
Figure 2:
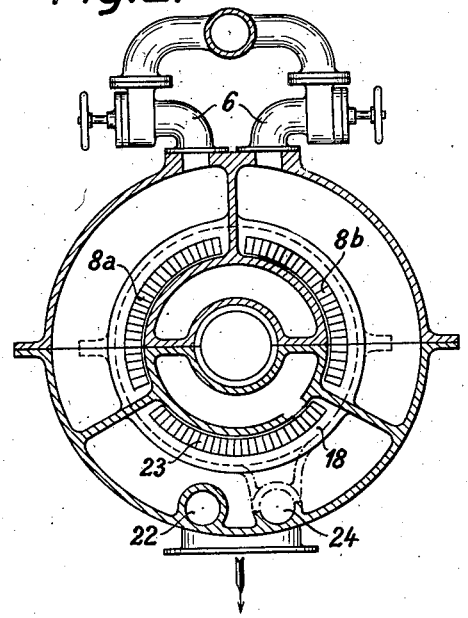
Figure 5:
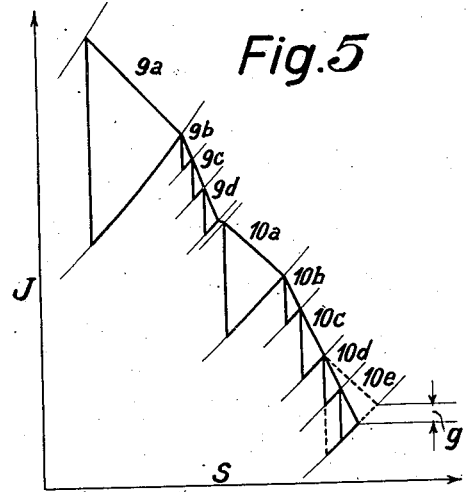
Figure 4:
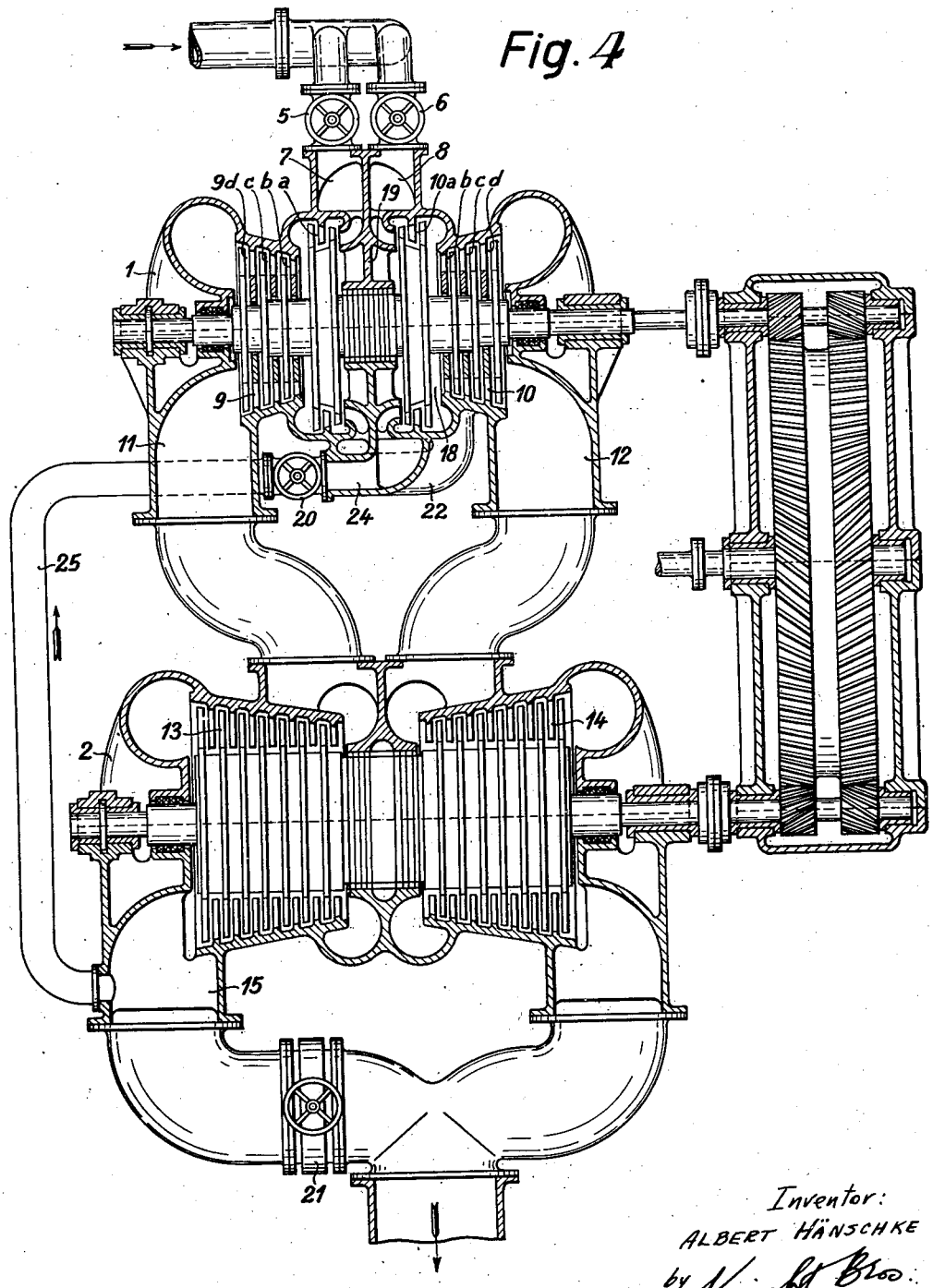

In order that the invention may be clearly understood and easily carried into effect, three constructional embodiments of the same are illustrated in the accompanying drawings by way of example. In these drawings Figure 1 is a longitudinal section of a double flow high pressure turbine the one part of which has a greater number of stages than the other part, and shows the first embodiment of the invention, Figure 2 is a cross section of this turbine on the line II—II of Figure 1 and shows the individual nozzle groups of the one turbine part, Figure 3 is a representation similar to that of Figure 1 and shows the second embodiment, in which only the one part of the high pressure turbine comprises a Curtis wheel forming the first stage, Figure 4 is a representation likewise similar to that of Figure 1 and shows the third embodiment of the invention, in which the two parts of the double flow high pressure turbine have equal numbers of stages, the stages being distributed on two casings, Figure 5 is a JS-diagram (heat content-entropy) and shows, with the two parts of the high pressure turbine arranged in series, the distribution of the fall at the individual stages and the profit in utilized fall obtained by the greater number of stages of the last traversed part according to the first embodiment.

The embodiment represented in Figures 1 and 2 will be described first.

The live steam piping leads through the stop valves 5 and 6, which are arranged in parallel, to the nozzle chambers 7 and 8 of the two parts 9 and 10 of the high pressure turbine 1, which chambers are separated from one another. In the nozzle chambers 7 and 8 are arranged, respectively, several nozzle groups 7a, 7b and 8a, 8b, to which steam may be supplied also individually. The nozzle group 7b does not show in the drawings, but is the same as the group 8b. The nozzle groups 8a and 8b which correspond to the nozzle groups 7a and 7b, are illustrated in Figure 2. According to the invention in this embodiment the one turbine part, 10, has more stages than the part 9. The individual stages are denoted by the reference numbers of the respective turbine parts and the indices a, b, c, d, e, that is, by 9a, 9b, 9c, 9d and, respectively, 10a, 10b, 10c, 10d, 10e. The exhaust pipes of the two parts 9 and 10 are denoted by 11 and 12. A stop valve 21 is provided in the piping attached to the exhaust pipe 11. The latter, in addition, by means of a two-way valve 20 is in connection with either the nozzle chamber 23, see Figure 2, through a conduit 24 or through a conduit 22 situated beside the former, with the wheel chamber 18 which is situated in front of the second stage of the turbine part 10.

At low speeds the turbine part 10 is now traversed after the part 9 in the manner indicated in principle in the aforesaid application Ser. No. 712,045, the valves 6 and 21 being closed, while the valves 5 are opened, the arrangement of which corresponds to that of the valves 6 illustrated in Figure 2. The regulation of the steam consumption is established by a corresponding adjustment of the valves 5, only one of the nozzle groups 7a or 7b, of the first-traversed turbine part 9, if required, being fed with steam. The steam passes through the part 9 and thence is led according to the position of the two-way valve 20 through either the conduit 24 to the nozzle chamber 23 or, if desired, without traversing the first stage 10a of the last traversed turbine part 10, which in this case runs idle, through the conduit 22 directly to the wheel chamber 18. The steam thence through the exhaust pipe 12 and the piping attached thereto enters the subsequent turbine.

In the JS diagram of Figure 5 is illustrated the course of the state of steam in a high pressure turbine constructed in accordance with the first-described embodiment. If the last stage is not divided, that is, if the turbine parts 9 and 10 are symmetrical, the course of the state of steam would be as marked by the dotted line. The fall of heat denoted by $g$ constitutes the profit in utilized fall obtained by this embodiment of the invention.

In the second example, Figure 3, only the part 9, which at low speeds is traversed first, comprises a Curtis wheel which forms the first stage 9a. As to the construction of the further stages, this second embodiment corresponds to that described. In this case, however, also at high speed the total quantity of steam is led first through the first stage 9a of the turbine part 9 and thence is divided and traverses in parallel flow the two parts 9 and 10. For the passage of a portion of the steam from the Curtis stage to the turbine part 10 the conduit 26, Figure 3, is used. To this end the valve 27 of this conduit is opened, whilst when the turbine parts 9 and 10 are connected in series it must be closed. Furthermore, all nozzle chambers of the part 10 with the appertaining nozzle groups and feed conduits are dispensed with in this embodiment.

The third embodiment represented in Figure 4 illustrates the invention as applied to a double-flow high pressure turbine which comprises a great number of stages and for constructional reasons is subdivided so as to comprise, in addition to the two parts 9 and 10 in a first casing, still two further parts 13, 14, each consisting of several stages and lodged in another casing 2 likewise in double flow arrangement. One part of the one casing thus co-operates with one of the parts of the other casing and the two associated parts 9, 13 and 10, 14 in common operate with the same total fall, according to the principle of the invention. The distribution of the fall according to the invention is obtained here by the feature, that the first stage 10a, formed by a Curtis wheel, of the part 10 of the high pressure turbine, which part at low speeds is traversed last, is dimensioned for operation with a greater fall of heat, when running in parallel arrangement, than the corresponding first stage 9a of the other part 9, which stage likewise is formed by a Curtis wheel. Therefore, each of the last stages of the part 14 operates with a smaller fall than the corresponding last stages of the part 13. When leaving the last stage of the parts 9 and 10 of the first casing, the steam may be in different state, since it is supplied from the outlet branches 11 and 12 in separate currents to the parts 13 and 14 of the second casing. It is only when leaving the last stage of these turbine parts 13 and 14 that the two steam currents must be in the same end state.

In this third embodiment the pipe 25 provided for the series connection of the two co-operating turbine parts 9, 13 and 10, 14, respectively, is branched off from the outlet socket 15 of the part 13 and again leads, according to the position of the two-way valve 20, through either the passageway 24 to the nozzle chamber 23 or through the passageway 22 to the wheel chamber of the part 10.

The different subdivision into individual stages of the two parts of the double flow turbine results with parallel arrangement of the two parts, that is, at high speed of the vessel, which occurs only rarely, in somewhat different efficiency of the two parts. This has, however, only quite a trifling influence on the total efficiency of the plant. When the two turbine parts are connected in series, however, that is, at cruising speed, which occurs much more frequently, the invention results in a further increase of the high economy of the turbine plant, which is obtained to a large extent by the arrangement according to the aforesaid application.

What I claim and desire to secure by Letters Patent is:

1. In a steam turbine plant, particularly for a ship's power plant, a double flow high pressure turbine comprising two parts having common supply and exhaust conduits, whereby the steam flows in parallel streams through said parts and the total heat drop across both parts is equal; and means for connecting said two parts in series for low speeds, said turbine parts being designed so that the heat drop per stage is smaller in the last stages of the turbine part last traversed by the steam, in the series connection, than the heat drop per stage in the corresponding stages of the turbine part first traversed by the steam.

2. In a steam turbine plant, particularly for a ship's power plant, a double flow high pressure turbine comprising two parts having common supply and exhaust conduits, whereby the steam flows in parallel streams through said parts and the total heat drop across both parts is equal; and means for connecting said two parts in series for low speeds, the turbine part last traversed by the steam, in series connection, having a greater number of stages than the other turbine part.

3. In a steam turbine plant, particularly for a ship's power plant; a double flow high pressure turbine comprising two parts, namely, a first part which includes a Curtis wheel and a second part which has no Curtis wheel; means for connecting said parts in parallel, including means for conducting part of the exhaust steam from said Curtis wheel to the supply end of said second part; and means for connecting said parts in series, with said second part behind said first part; said turbine parts being designed so that the heat drop per stage is smaller in the last stages of said second part than in the corresponding stages of said first part.

4. In a steam turbine plant, particularly for a ship's power plant; a double flow high pressure turbine comprising two parts, namely, a first part which includes a Curtis wheel and a second part which has no Curtis wheel; means for connecting said parts in parallel, including means for conducting part of the exhaust steam from said Curtis wheel to the supply end of said second part; and means for connecting said parts in series, with said second part behind said first part; said second turbine part having a larger number of stages than said first part has behind said Curtis wheel.

5. A steam turbine plant as described in claim 1, wherein said high pressure turbine comprises two double flow casings each composed of two parts, and means connecting the parts of the first of said casings respectively with the parts of the second of said casings, so that each pair so connected forms a complete part of the double flow high pressure turbine.

ALBERT HÄNSCHKE.